United States Patent
Sircom

[15] 3,670,206
[45] June 13, 1972

[54] PROTECTION AGAINST ELECTRICAL SHOCK

[72] Inventor: Richard Cumming Sircom, Windsor, Nova Scotia, Canada

[73] Assignee: Eastech Limited

[22] Filed: April 12, 1971

[21] Appl. No.: 133,158

[30] Foreign Application Priority Data

Oct. 6, 1970 Canada..................................094,882

[52] U.S. Cl....................317/18 D, 317/27 R, 317/33 R
[51] Int. Cl. ......................................................H02h 3/28
[58] Field of Search................317/18 R, 18 D, 27 R, 33 R; 340/255

[56] References Cited

UNITED STATES PATENTS

| | | |
|---|---|---|
| 2,700,125 | 1/1955 | King et al..............................317/18 D |
| 3,319,123 | 5/1967 | Scanlan................................317/18 D |
| 3,320,480 | 5/1967 | Failor..................................317/18 D |
| 3,515,941 | 6/1970 | Moore et al..........................317/18 D |

Primary Examiner—James D. Trammell
Attorney—Stevens, Davis, Miller & Mosher

[57] ABSTRACT

To reduce the danger of electrical shock in two-wire non-grounded electrical systems, the leakage current from line L1 to ground is balanced by an injected current from ground to line L1, and similarly the leakage current from line L2 to ground is balanced by an injected current from ground to line L2.

In this way, the leakage current from line L1 to ground cannot pass through a human body from ground to L2, since the leakage current form a closed current loop.

21 Claims, 18 Drawing Figures

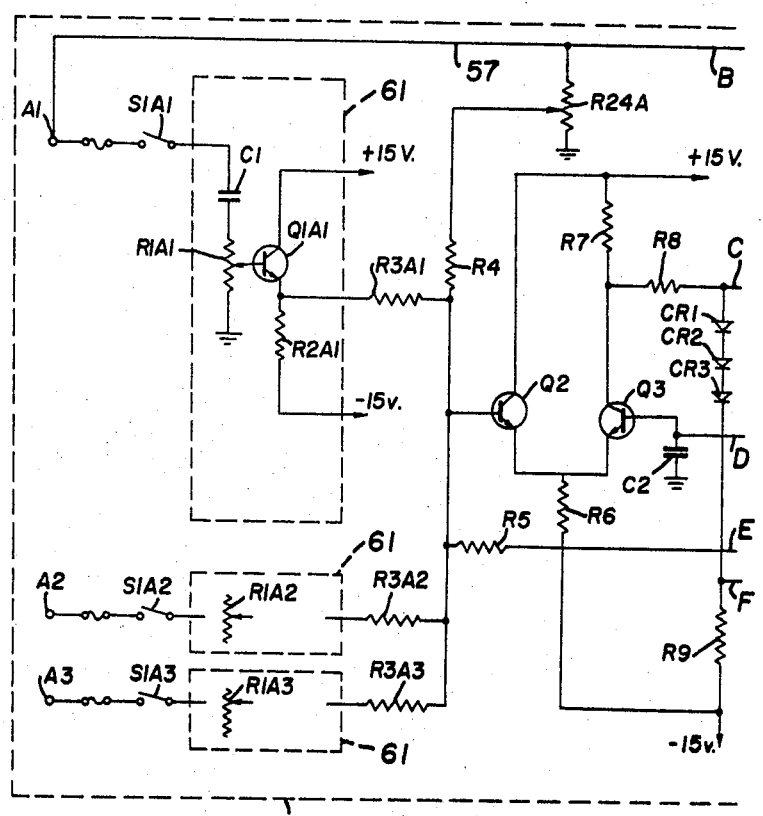
FIG. 6A
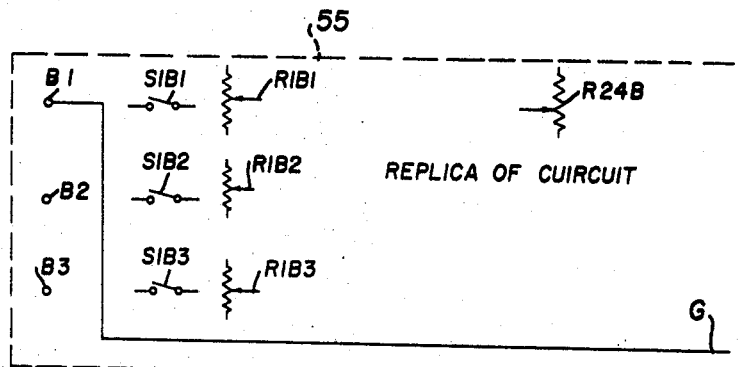

PROTECTION AGAINST ELECTRICAL SHOCK

The present invention is an improvement of the invention disclosed in applicant's early U.S. Pat. application No. 060,887.

The present invention relates to an improvement in the invention described and claimed in our copending Canadian Pat. application No. 060,887, filed Sept. 2, 1969 and U.S. Pat. application No. 833,463, filed June 16, 1969.

That earlier invention relates to protective means adapted to reduce the danger of electrical shock in two-wire non-grounded electrical systems.

Systems of this general type are commonly used in situations where the danger caused by an electrical shock is greater than would normally be the case. Thus in wet conditions, such as in association with swimming pools, where a very good ground connection can exist from the body of a human, and in conditions such as during surgical operations where electrical apparatus is used on particularly sensitive parts of the human body, a current can flow through part of a human body which is sufficient to cause death.

Existing systems are effective to reduce considerably the danger of the passage of relatively large ground currents, but it has been found that often a relatively small ground current can also be lethal. The dangerous level of current is so low that even the relatively small capacitive line-to-ground leakage current in a normal system is large enough to be fatal.

An object of the said earlier invention is the provision of protective means adapted to reduce the danger of electrical shock in two-wire non-grounded electrical systems, and capable of providing protection even against the relatively small capacitive line-to-ground leakage currents.

According to the earlier invention, in protective means adapted to reduce the danger of electrical shock in a two-wire non-grounded electrical system, current generating means cause a first current to be injected between ground and a first of two lines of the system, this current being substantially equal to and in phase with a first leakage current between that first line and ground, and the current generating means cause a second current to be injected between ground and the second of the two lines of the system, this current being substantially equal to and in phase with a second leakage current between that second line and ground, whereby the part of the first leakage current which can flow from ground through a body to the second line, and the part of the second leakage current which can flow from ground through a body to the first line, are substantially reduced.

The object of the present invention is to provide an improved protective means which operates basically as set out in the previous paragraph, but which involves the use of less equipment.

According to the present invention, in protective means adapted to reduce the danger of electrical shock in a two-wire non-grounded electrical system, current generating means cause a first current to be injected between ground and a first terminal, this current being substantially equal to and in phase with a first leakage current between a first of the two lines of the system and ground, and in which the current generating means cause a second current to be injected between ground and a second terminal, this current being substantially equal to and in phase with a second leakage current between the second of the two lines of the said system and ground, and the said terminals being connected to at least one of the two said lines, whereby the part of the first leakage current which can flow from ground through a body to a second line, and the part of the second leakage current which can flow from ground through a body to the first line, are substantially reduced.

The invention will now be described, by way of example, with reference to the accompany drawings, of which FIGS. 1 through 6B are copied from said earlier application, and in which:

Figure 1:
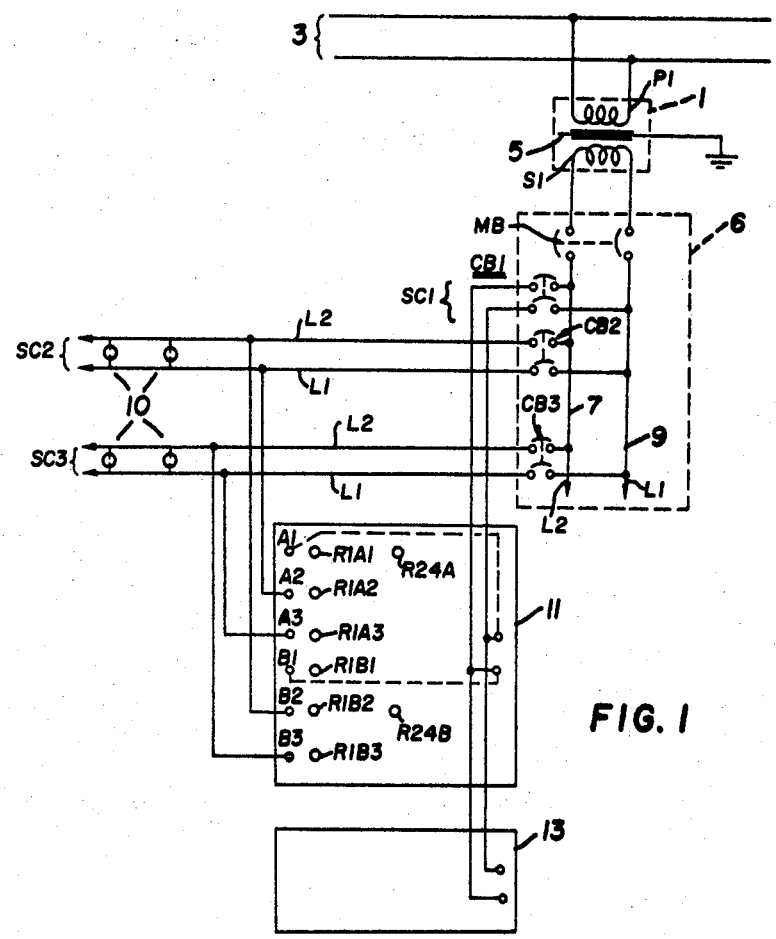
FIG. 1 is a diagrammatic representation of a two-wire non-grounded electrical power supply system, and of protective apparatus applied thereto.
Figure 14C:
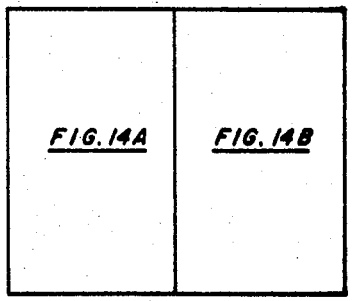
Figure 5:
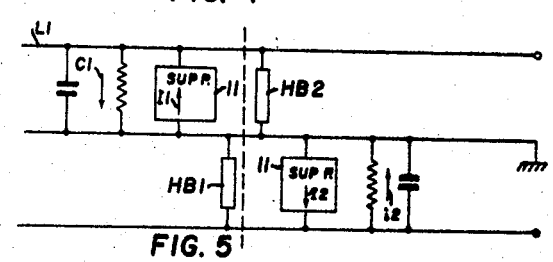
Figure 6C:
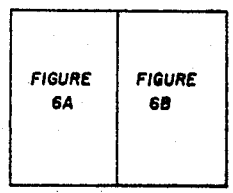
Figure 6B:
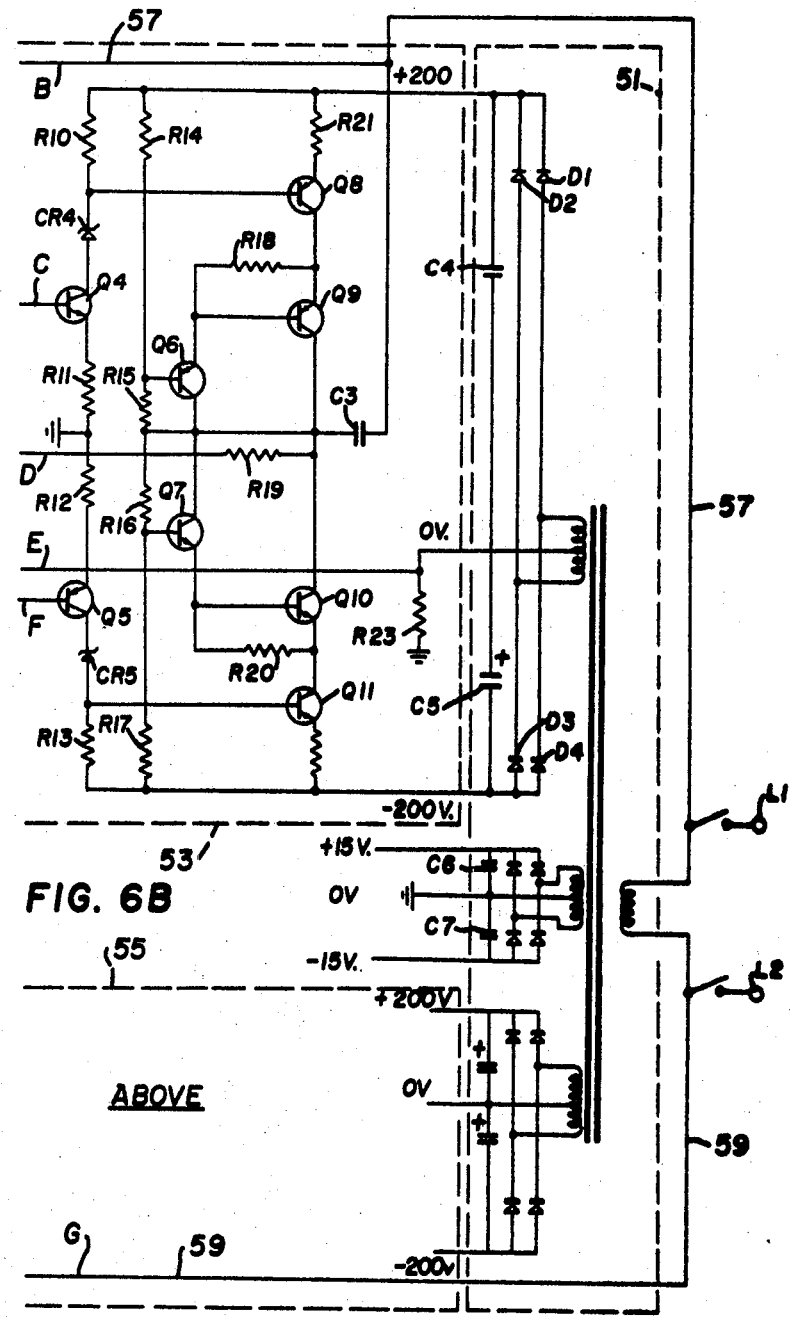
Figure 10:
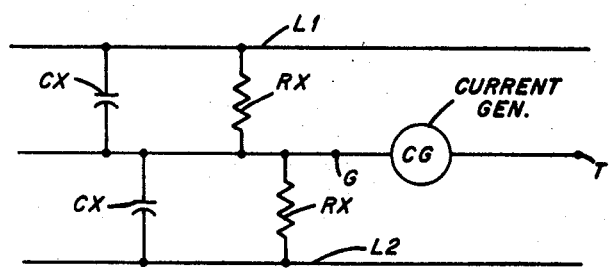
Figure 11:
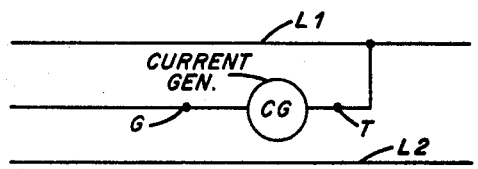
Figure 12:
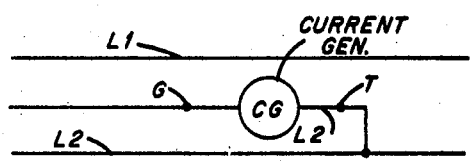
Figure 13:
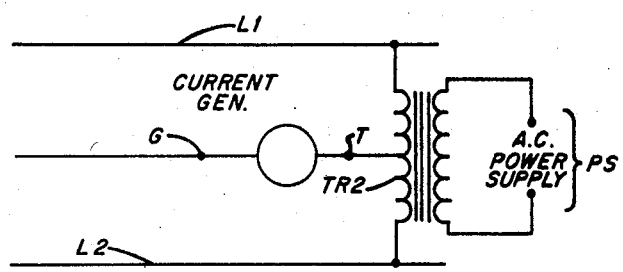
Figure 14A:
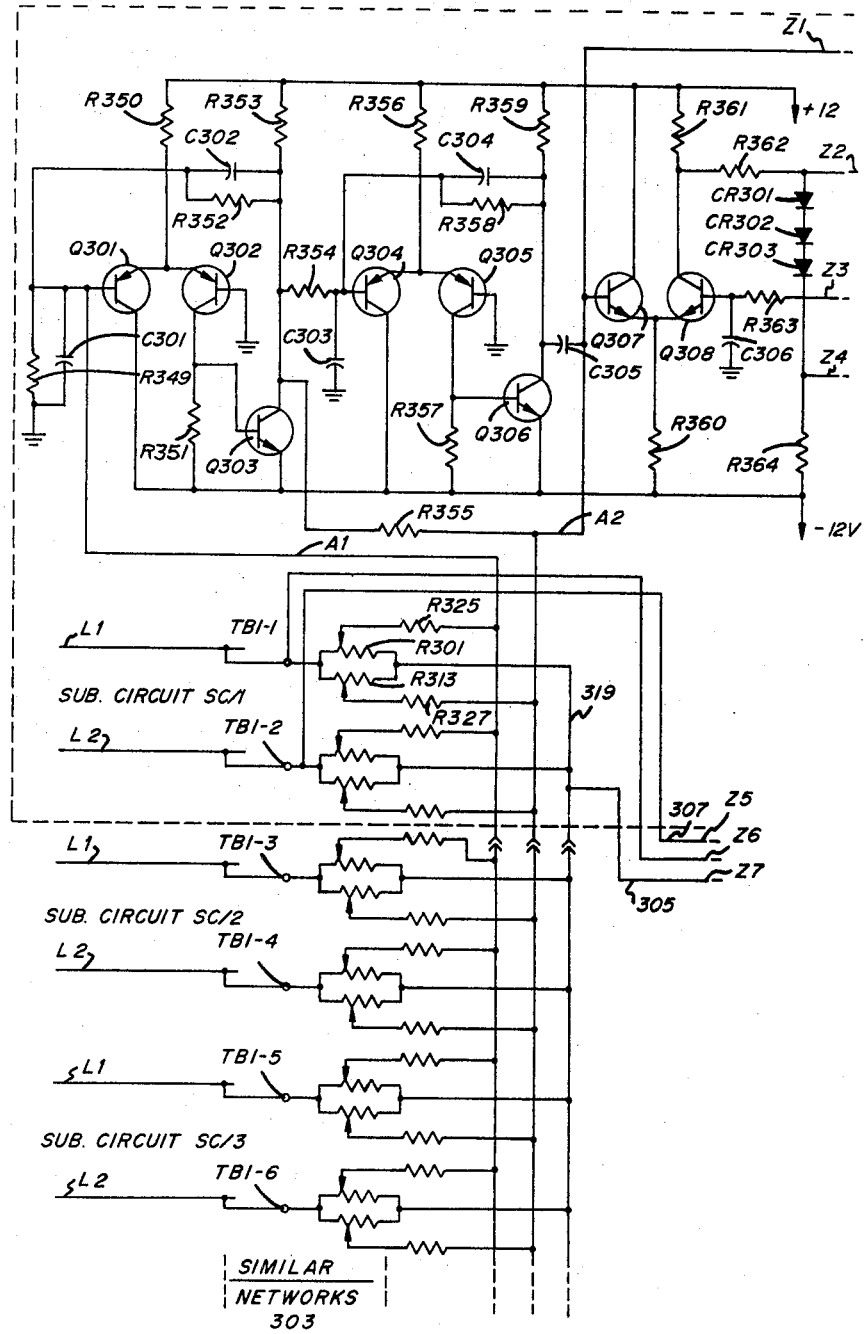
Figure 14B:
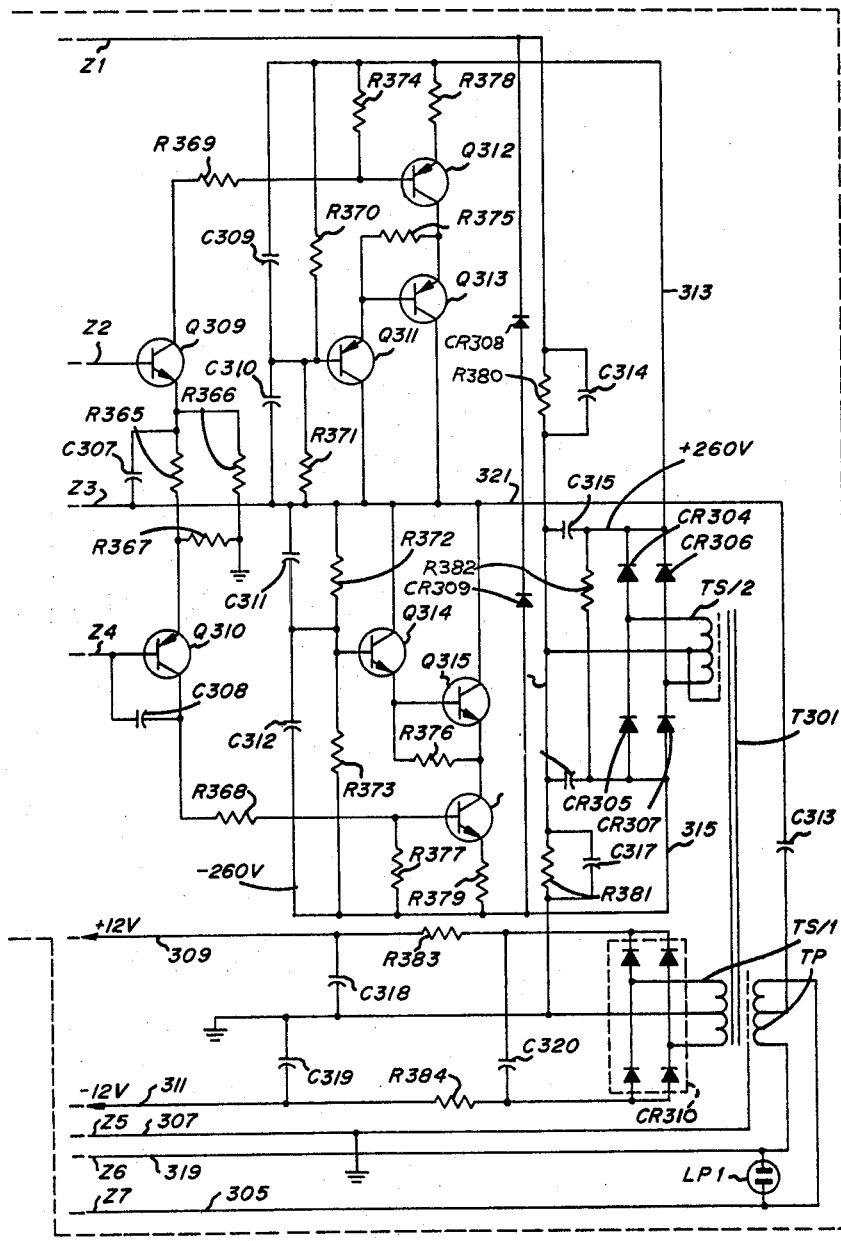

FIGS. 6A and 6B, when arranged side-by-side as indicated in FIG. 6C, together show the circuit diagram of a capacitive-leakage-current suppressor shown in FIG. 1;

FIGS. 7 through 10 are explanatory circuit diagrams relating to a modification of the circuit shown in FIG. 5;

FIGS. 11 through 13 are circuit diagrams showing respectively three ways of putting the embodiment of FIG. 10 into practice; and FIGS. 14A and 14B, when arranged as in FIG. 14C, form a circuit diagram of a complete system utilizing the arrangement of FIG. 13.

Referring first to FIG. 1, an isolating transformer 1 having a primary winding P1 connected across an alternating current supply 3 and having a grounded electrostatic screen 5, has a secondary winding S1 which is used to energize an isolated power system through a contact breaker panel 6.

The contact breaker panel 6 is orthodox in that it includes two insulated bus bars 7 and 9 connected respectively to the two ends of the secondary winding S1, and a plurality of automatic overload contact breakers CB1, CB2, and CB3. A main manual circuit breaker MB is arranged to permit breaking of both connections to the bus bars 7 and 9, and each circuit breaker CB1, CB2, and CB3 also is effective to break both poles of the supply.

The contact breakers CB1, CB2, and CB3 are arranged to control the supply of alternating current electrical power to separate sub-circuits SC1, SC2 and SC3 and typically each sub-circuit would supply a number of two-pin or three-pin power outlets 10 into which portable or movable electrical equipment could be plugged as and when required.

Systems such as have been described so far are well known in the art and are used in environments, such as hospitals, where it is desired to eliminate the risk of ground fault currents. Since both poles of the supply are isolated from ground, no large ground current can flow unless two faults to ground exist, one from each pole of the isolated supply. However, such systems are inherently defective in that there is a capacitive coupling between each live part of the system and ground, and although the capacitive currents which flow per foot run may be small, they total to a considerable current in a large system.

In the system shown in FIG. 1, i.e., the system of the earlier invention, contact breaker CB1 is used solely as a power supply for a capacitive-leakage-current suppressor 11 and a ground leakage current indicator 13. The suppressor 11 includes a first set of input terminals A1, A2, and A3 for connection respectively to a first pole of each of the subcircuits it is desired to monitor, and a second set of input terminals B1, B2 and B3 for connection respectively to the second pole of those subcircuits. The connections to terminals A1 and B1 are actually internal leads of the suppressor 11. As indicated in FIG. 1, the suppressor 11 includes a series of variable potentiometers R1A1, R1A2, R1A3, R1B1, R1B2 and R1B3 and these are associated respectively with the input terminals A1 to B3. Associated with the group of terminals connected to first pole of the supply, i.e., the terminals A1, A2 and A3, is a variable potentiometer R24A and associated with the group of terminals connected to the other pole of the supply is a variable potentiometer R24B.

Figure 2:
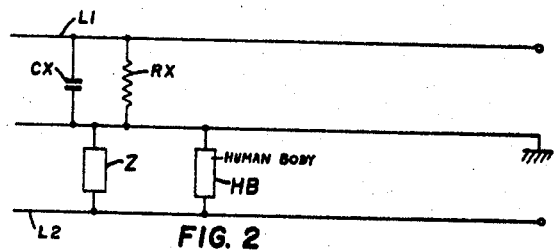
FIGS. 2 to 5 are explanatory diagrams relating to leakage currents and the present invention.
Figure 3:
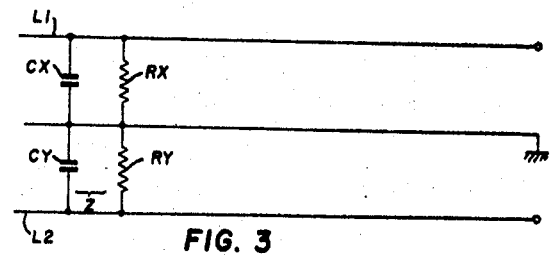

FIG. 2 is a diagram showing how a capacitive leakage current can flow through leakage capacitance CX and a resistive leakage current can flow through leakage resistance RX from line L1 to ground and thence through any available impedance Z to the other line L2. FIG. 3 illustrates how the similar leakage capacitance CY and leakage resistance RY between line 12 and ground together usually form the impedance Z. The direction of current flow is, in view of the alternating potential involved, also alternating. Referring back to FIG. 2, it will be seen that if a human body HB bridges the insulation between line L2 and ground, it shunts the impedance Z, and the leakage current between line L1 and ground now passes partly through that human body HB. If the impedance of the body is low compared with impedance Z, which will often be the case, the leakage current will flow for the most part through the human body HB.

Figure 4:
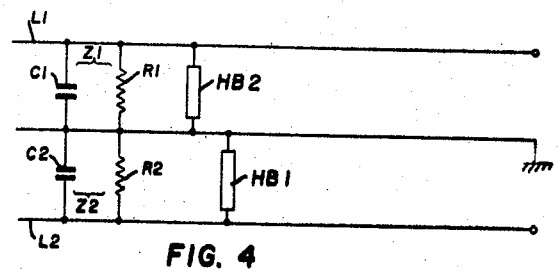

Referring now to FIG. 4, it will be seen that a first human body HB1 connected between L2 and ground would shunt the impedance Z2 presented by leakage capacitance C2 and leakage resistance R2, and would pass the leakage current from line L1 to ground on to line L2. On the other hand, a second human body HB2 connected between L1 and ground would shunt the impedance Z1 presented by leakage capacitance C1 and leakage resistance R1, and would pass the leakage current from line L2 to ground on to line L1. The operation of the suppressor 11 is indicated schematically in FIG. 5. Ideally, the suppressor produces a current I1 from ground to line L1 which is exactly equal to leakage current I1 from line L1 to ground. Since there is no net current flow from line L1 to ground, a human body HB1 connected between ground and line L2 will pass no current. Similarly, ideally the suppressor produces a current I2 from ground to line L2 which is exactly equal to leakage current I2 from line L2 to ground, a human body HB2 connected between ground and line L1 will pass no current. It will be understood that the presence of body HB1 must not occur at the same time as the presence of body HB2, since then both bodies would carry currents.

The suppressor 11 (see FIGS. 6A and 6B) includes a power supply 51 and two sub-circuits 53 and 55 which are associated respectively with line L1 and line L2. The power supply 51 provides separate d.c. supplies at +200 v., 0 v., and −200 v. to sub-circuit 53 and to sub-circuit 55. It also supplies a common d.c. supply at +15 v., 0 v., and −15 v., as indicated. In these two Figures, leads A to G on each Figure are connected to the corresponding leads on the other Figure. The components used in suppressor 11 include the following:

| Transistors | | Resistors | |
|---|---|---|---|
| Q1A1 | | R1A1 | 10,000 ohms |
| Q2 | 2N3711 | R1A2 | 10,000 ohms |
| Q3 | | R1A3 | 10,000 ohms |
| Q4 | | R1B1 | 10,000 ohms |
| Q5 | 2N3702 | R1B2 | 10,000 ohms |
| Q6 | 2N5415 | R1B3 | 10.000 ohms |
| Q7 | 2N3440 | | |
| Q8 | 2N5415 | R2A1 | 4,700 ohms |
| Q9 | 2N5415 | | |
| Q10 | 2N3440 | R3A1 | 100,000 ohms |
| Q11 | 2N3440 | R3A2 | 100,000 ohms |
| | | R3A3 | 100,000 ohms |
| Diodes | | | |
| | | R4 | 10 megohms |
| D1 | 1N5212 | R5 | 100,000 ohms |
| D2 | 1N5212 | R6 | 82,000 ohms |
| D3 | 1N5212 | R7 | 8,200 ohms |
| D4 | 1N5212 | R8 | 4,700 ohms |
| | | R9 | 15,000 ohms |
| CR1 | 1N914 | R10 | 4,700 ohms |
| CR2 | 1N914 | R11 | 470 ohms |
| CR3 | 1N914 | R12 | 470 ohms |
| CR4 | VR180 | R13 | 4,700 ohms |
| CR5 | VR180 | R14 | 470,000 ohms |
| CR6 | 384Z | R15 | 470,000 ohms |
| CR7 | 384Z | R16 | 470,000 ohms |
| CR8 | 384Z | R17 | 470,000 ohms |
| CR9 | 384Z | R18 | 4,700 ohms |
| | | R19 | 330,000 ohms |
| Capacitors | | R20 | 4,700 ohms |
| | | R21 | 220 ohms |
| C1 0.0033 | MFD | R22 | 220 ohms |
| C2 250 | MFD | R23 | 100 ohms |
| C3 0.1 | MFD | R24A | 2 megohms |
| C4 20 | MFD | R24B | 2 megohms |
| C5 20 | MFD | | |
| C6 50 | MFD | | |
| C7 50 | MFD | | |

Considering first sub-circuits 53, terminals A1, A2 and A3 are indicated, and it will be noted that a lead 57 connects the input line L1 to the terminal A1 while a lead 59 connects the input line L2 to terminal B1. Thus the suppressor uses one of its inputs to monitor the power supply to the suppressor. Through the series combination of capacitor C1 and potentiometer R1A1, the line L1 is connected to ground when switch S1A1 is closed. S1A1 is one set of contacts of a multiple switch, other sets of contacts being indicated at S1A2, S1A3, S1B1, S1B2 and S1B3. Transistor Q1A1 has its base connected to the slider of potentiometer R1A1, and its emitter is at very close to ground potential, since its base is connected to ground through resistor R1A1. This emitter is connected to a differential amplifier formed by transistors Q2 and Q3, and the output of transistor Q1A1 is compared with the average of the amplifier output voltage, the averaging being effected by a low-pass filter formed by resistor R19 and capacitor C2. Differences between these two voltages are amplified by the differential amplifier in phase-opposition to stabilize the output voltage operating point at ground voltage. The input voltage to transistor Q1A1 is proportional to the current flowing through capacitor C1, and since the reactance of the capacitor C1 is much higher than the resistance of resistor R1A1, this current will be in phase with the currents flowing in the leakage capacitance between line and ground in the sub-circuits SC1 and the apparatus connected to it, and also will be proportional to that current. By adjustment of the resistor R1A1, this proportionality can be adjusted so that the output current flowing from ground-to-line is equal to the leakage current flowing from line-to-ground, to result as discussed above in a closed current loop between line L1 and ground.

It will be seen that each of the inputs A1, A2 and A3 has associated with it an input circuit 61 which, in the case of input A1 contains capacitor C1, resistor R1A1, transistor Q1A1, and an emitter resistor R2A1. The other input circuits 61 are similar to that one, and each (when the associated circuit breaker is closed) will supply an a.c. current through an associated adding resistor R3A1, R3A2 or R3A3 to the input of the differential amplifier, so that the sub-circuit 53 operates to balance the leakage current from line L1 to ground for the circuits selected by closure of the circuit breakers CB2 and CB3.

Dealing now in more detail with the sub-circuit 53, the output stage is a push-pull complementary-symmetry circuit including transistors Q8, Q9, Q10 and Q11, in which the voltage between the output on the collectors of transistors Q9 and Q10 and the positive and negative supply rails (i.e., the leads at +200 volts and at −200 volts) is shared equally by transistors Q8-Q9, and Q10-Q11 respectively. This is effected by a voltage dividing chain of resistors R14, R15, R16 and R17, the values of which resistors are equal, and the mid-point of which resistive chain is connected to the output, i.e., to line L1 through d.c. isolating capacitor C3. Emitter-follower transistor Q6 and Q7 hold the emitters of transistors Q9 and Q10 at voltages mid-way between the output voltage and the positive and negative supply rail voltages, respectively. Output transistors Q8 and Q11 are driven in phase opposition by transistors Q4 and Q5 through Zener coupling diodes CR4 and CR5 respectively. These reduce the collector-to-emitter voltage applied to transistors Q4 and Q5, allowing the use of low voltage transistors in this stage.

The idling current in the output stage is determined by the voltage difference between the bases of transistors Q4 and Q5, which is held at a constant value by the current flowing through forward-biassed diodes CR1, CR2 and CR3. This current flows through the resistive coupling chain formed by resistors R8 and R9, from the collector of transistor Q3. Negative current feedback is applied by sensing the output current as a voltage drop across resistor R23 in the return line from ground to the common of the dual power supply. This signal is fed back through a summing resistor R5 to the junction of resistors R3A1 to R3A3 and the base of transistor Q2, and is in phase-opposition to the input.

By adjustment of potentiometer R24A, an input voltage can be added at the base of transistor Q2 which will be in phase with the line-to-ground voltage, and which will therefore produce an output current from ground-to-line equal to the resistive leakage current flowing from line-to-ground through permitted resistive leakage paths, such as through resistors R14, R15, R16 and R17, as well as in external circuits such as the leakage detecting indicator 13.

Sub-circuit 55 is a duplicate of sub-circuit 53 described above, but in this case line terminal L2 is connected to input terminal B1 and so this sub-circuit monitors and compensates for leakage from line L2 to ground. It is necessary to use separate power supplies, fed from individual windings on the power transformer, since the mid-point of the power supply as regards sub-circuit 55 is not the same signal potential as that in sub-circuit 53.

It will be appreciated that although three input terminals A1, A2, and A3 (for line L1) and three input terminals B1, B2 and B3 (for line L2) are provided, any number of such input terminals can be used, in two groups, one for each line L1 or L2, when the total number of sub-circuits to be monitored for capacitive leakage currents exceeds three.

In the use of the apparatus as illustrated in FIG. 1, the various potentiometers R1A1 to R1A3, and the potentiometers R24A and R24B, are adjusted in sequence to obtain a minimum reading on the meter of the ground leakage monitor. Basically, each of the two potentiometers R24A and R24B requires only one adjustment to bring the indicated fault to a minimum value, and the other potentiometers may require repeated adjustment until all leakage currents have been balanced. This adjustment can be expedited by first leaving contact breakers CB2 and CB3 open, and adjusting the potentiometers to balance only the leakage currents for the sub-circuits SC1. Next the contact breaker CB2 can be closed and adjustment made only to potentiometers R1A2 and R1B2 and possibly R24A and R24B, to compensate for leakage currents in sub-circuit SC2. Finally, contact breaker CB3 can be closed and potentiometers R1A3 and R1B3 adjusted to compensate for leakage currents in sub-circuit SC3, a final adjustment of potentiometers R24A and R24B possibly being necessary.

Since the apparatus described above does not automatically adjust itself to compensate for changes in the leakage currents in the apparatus in the system, it is necessary to repeat the adjustment whenever equipment is switched into or out of circuit.

It is to be noted that when the suppressor 11 is switched off, by the use of a common operating knob for all the switches shown in it, all parts of the suppressor are isolated from the electrical supply system.

The apparatus which has been described above enables the leakage current which can flow between a line and ground through a human body to be kept to a very small values. The apparatus is used in conjunction with a ground leakage indicator such as the indicator 13 shown, so that any major ground fault on any of the electrical circuits will be noted by that indicator. The suppressor 11 acts to compensate for line-to-ground currents which are inherent in the use of the electrical apparatus, and which therefore cannot be dealt with by cessation of the electrical supply. It will be seen that whereas known types of ground-current protection equipment deal with fault conditions, the suppressor of the present invention deals with normal leakage currents.

By the provision of separate adjusting means for compensation of the capacitive leakage currents of various sub-circuits, it is possible to deal with the situation where the ratio of capacitive leakage current to resistive leakage current varies from sub-circuits to sub-circuit.

The above description relates to the apparatus set out in the earlier application referred to above, and is included to ensure that the present disclosure is free from insufficiency in disclosing the basic principles of the further present invention.

Figure 7:
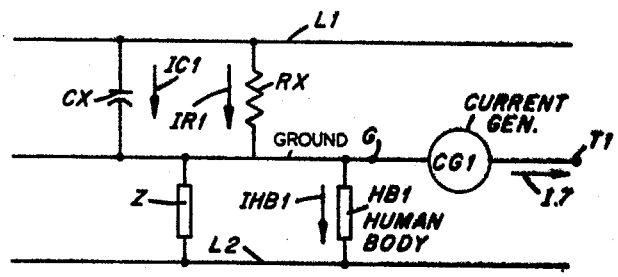

Referring now to FIG. 7, this Figure is generally similar to FIG. 5, and is a diagram showing how a capacitive leakage current IC1 can flow through leakage capacitance CX and a resistive leakage current IR1 can flow through leakage resistance RX from a line L1 to ground (i.e., to metal parts of equipment) and thence through any available impedance Z to the other line L2. It will be seen that if any human body HB1 bridges the insulation between line L2 and ground, it shunts the impedance Z, and the leakage current between line L1 and ground now passes partly through that human body HB1. If the impedance of the body is low compared with the impedance Z (which typically is the insulation impedance between ground and line L2), which will often be the case, the leakage current will flow for the most part through the human body.

Also shown in FIG. 7 is a current generator CG1 which is arranged to drive between ground and a terminal T1 a current I7. It will be seen that, if current I7 is maintained equal to the vector sum of leakage currents IC1 and IR1, no current is available on ground to flow through the human body HB to line L2. Putting this point more technically, on applying Kirchoff's first law, if the conductors forming part of a network carrying a steady current meet at one point, i.e., at ground G, the sum of the currents flowing towards the point is equal to the sum of those flowing away from it. Since treating ground as said one point, IC and IR flowing towards ground are equal in vector sum to current I7 flowing away from ground, the current IHB1 through the human body HB1 must be zero.

Figure 8:
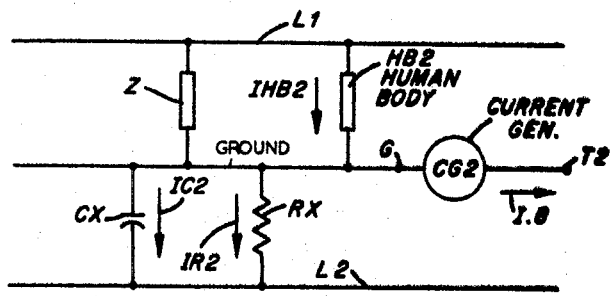

Similarly, in FIG. 8, as long as the vector sum of capacitive leakage current IC2 and resistive leakage current IR2 from line 2 to ground is equal to a current I8 driven by a current generator CG2 from ground to a terminal T2, it can be shown that the current IHB2 which can flow through a human body HB2 is zero.

It is to be noted that it is quite unimportant where current I7 or current I8 passes to in the system, although common sense excludes ground from that remark, since then Kirchoff's first law would not apply to ground treated as the said one point.

Figure 9:
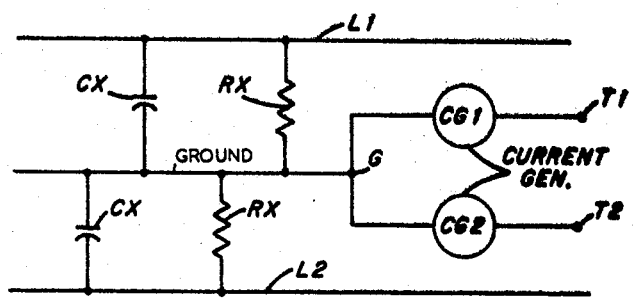

A logical development of FIGS. 7 and 8 would be FIG. 9, in which the two current generators CG1 and CG2 respectively drive currents from ground to terminals T1 and T2 respectively. Proceeding further, T1 and T2 can be a common terminal T, and since it is redundant to use two current generators operating in parallel between the same two points, as shown in FIG. 10 a single current generator CG can be used acting between ground G and terminal T.

FIGs. 11, 12 and 13 show respectively three ways of connecting terminal T into the complete system, i.e., respectively to line L1, to line L2, and to the center tap on a primary winding of transformer TR2 which has its ends connected respectively to lines L1 and L2. The secondary winding of transformer TR2 supplies the rectifier circuit furnishing d.c. power to the current generator and its associated circuits. This current generator suitably is a current amplifier of theoretically infinite output impedance, and therefore is indifferent as to the voltage appearing at its output terminals, providing this voltage is within its output voltage swing capabilities.

FIGS. 14A and 14B correspond to FIGS. 6A and 6B and when taken together show a complete system for the protection of a number of sub-circuits. The leads which interconnect the two Figures are designated Z1 through Z7. The top part of FIG. 14A and the whole of FIG. 14B together depict a master circuit 301 while the lower part of FIG. 14A shows a number of similar networks 303 each of which protects an associated subcircuit. FIG. 14A is a simplification of the working circuit, in which the upper network 303 is included in the master circuit 301, and said further networks 303 are provided in a single unit with jack facilities for plugging in one or more blocks of additional networks.

FIGS. 14A and 14B are circuit diagrams utilizing standard symbols and comprising standard transformers, transistors, diodes, resistors and capacitors interconnected in the manner indicated. In order that the disclosure of this embodiment of the invention shall be complete, the technical details of the items shown in these Figures is listed below:

| TRANSFORMERS | | RESISTORS | |
| --- | --- | --- | --- |
| T1 | Hammond 83197 | R301 | Potentiometer 5 megohm |
| TRANSISTORS | | R313 | do |
| Q301 | MPS3702 | R325 | 10 megohms |
| Q302 | MPS3702 | R327 | 10 megohms |
| Q303 | MPS3711 | R349 | 100 k. ohms |

| | | | |
|---|---|---|---|
| Q304 | MPS3702 | R350 | 33 k. ohms |
| Q305 | MPS3702 | R351 | 10 k. ohms |
| Q306 | MPS3711 | R352 | 100 k. ohms |
| Q307 | MPS3711 | R353 | 10 k. ohms |
| Q308 | MPS3711 | R354 | 100 k. ohms |
| Q309 | MM3003 | R355 | 1.8 megohms |
| Q310 | MM4003 | R356 | 33 k. ohms |
| Q311 | MM4003 | R357 | 10 k. ohms |
| Q312 | MM4003 | R358 | 100 k. ohms |
| Q313 | MM4003 | R359 | 10 k. ohms |
| Q314 | MM3003 | R360 | 3.9 k. ohms |
| Q315 | MM3003 | R361 | 4.7 k. ohms |
| Q316 | MM3003 | R362 | 12.0 k. ohms |
| CAPACITORS | | R363 | 470 k. ohms |
| C301 | 100 pf | R364 | 27 k. ohms |
| C302 | 12 pf -11 | R365 | set on test |
| C303 | 100 pf | R366 | 1.8 k. ohms |
| C304 | 12 pf | R367 | 1.8 k. ohms |
| C305 | 0.022 µf | R368 | 33 k. ohms |
| C306 | 330 µf | R369 | 33 k. ohms |
| C307 | 470 pf | R370 | 470 k. ohms |
| C308 | 470 pf | R371 | 470 k. ohms |
| C309 | 0.001 µf | R373 | 470 k. ohms |
| C310 | 0.001 µf | R374 | 4.7 k. ohms |
| C311 | 0.001 µf | R375 | 4.7 k. ohms |
| C312 | 0.001 µf | R376 | 4.7 k. ohms |
| C313 | 2 µf | R377 | 4.7 k. ohms |
| C314 | 0.001 µf | R378 | 220 ohms |
| C315 | 4 µf | R379 | 220 ohms |
| C316 | 4 µf | R380 | 182 k. ohms |
| C317 | 0.047 µf | R381 | 562 ohms |
| C318 | 50 µf | R382 | 1.8 megohm |
| C319 | 50 µf | R383 | 1 k. ohm |
| C320 | 20 µf | R384 | 1 k. ohm |

| DIODES AND RECTIFIERS | | | | LAMPS |
|---|---|---|---|---|
| CR301 | IN914 | CR306 | 10D8 | LP1 NE51H |
| CR302 | IN914 | CR307 | 10D8 | |
| | | CR308 | 10D8 | |
| | | CR309 | 10D8 | |
| CR303 | IN914 | CR310 | BY179 | |
| CR304 | 10D8 | | | |
| CR305 | 10D8 | | | |

It will be seen that lines L1 and L2 of sub-circuit SC/1 are connected respectively to terminals TB1-1 and TB1-2 of the uppermost of the networks 303, and that from these terminals leads 305 and 307 connect respectively to the two ends of a centertapped primary winding TP of transformer T301. The transformer has a low voltage first secondary winding TS/1 arranged to energize full-wave rectifier CR310, which provides a +12 volts direct voltage on lead 309 and 2-12 volts direct voltage on lead 311, the zero voltage appearing on ground. The transformer also has a high voltage second secondary winding TS/2 arranged to energize the full-wave rectifiers CR304-CR307 which produces a +260 direct voltage on lead 313 and a −260 direct voltage on lead 315, relative to centertap lead 317.

In the upper network 303, input terminal TB1-1 is connected to one end of each of two potentiometers R301 and R313, the other ends of which are connected together and to ground through a lead 319. The slider of potentiometer R301 is connected through a resistor R325 to an input lead A1 of the master circuit 301, and the slider of potentiometer R313 is connected through a resistor R327 to a second input lead A2 of the remainder of the master circuit. It will be noted that, apart from the provision of leads 305 and 307, all the networks 303 are similar, each network being connected to one of the sub-circuits to be protected, and each being connected to all three leads A1, A2 and 319.

Considering now the remainder of the master circuit 301, the three transistors Q301, Q302 and Q303 can be considered as a group forming an operational amplifier AR1 having an inverting (−) input connected to lead A1 and a non-inverting input (+) (the base of transistor Q302) connected to ground. The output of this amplifier, on the collector of transistor Q303, is fed back to its inverting input through the resistor R352 and also is fed through resistor R354 to the inverting (−) input of a second operational amplifier formed by transistors Q304, Q305 and Q306, the non-inverting input (+) of which (base of transistor Q305) is connected to ground. The output of this amplifier, on the collector of transistor Q306, is connected back to its inverting input (−) through the resistor R358, and is connected through the capacitor C305 to the non-inverting (+) input of a third operational amplifier AR3 formed by transistors Q307 through Q316. The inverting input (−) (base of transistor Q308) is connected to ground through a capacitor C306.

An input signal to Q307 base, going instantaneously positive, say, produces a positive output current to the lines. This current flows to ground through the system leakage paths, enters the compensator from ground, and returns to the common of the high-voltage power supply (whence it came) through current-sensing resistor R381.

Assuming this is conventional current flow rather than electron flow, this current makes the common point of the supply instantaneously negative with respect to ground, and this is fed back through R380 to the base of Q307 in polarity-opposition to the input.

Thus the output amplifier Q307–Q316 behaves much as an ordinary operational amplifier, except that the feed back signal is a function of output current rather than output voltage.

The output current, then, is a closely-linear function of the input current through C305 and through resistors R325, R327 etc.

R355 performs a rather useful function. Since amplifier Q304–306 does not have zero output impedance, it contributes a small component of resistive output as its capacitive output is increased. This is largely cancelled by feeding an equal amount of output from amplifier Q301–303 through R355 to Q307 base, and since Q303 output is 180° out of phase with the input, this contribution can be considered a "negative-resistive" component. This feature greatly speeds up the adjustment procedure.

The input lead A2 of the master unit 301 also is connected to the non-inverting (+) input of the third operational amplifier AR3. The amplifier AR3 thus uses as inputs both a signal derived from the setting of the potentiometer R301, and a signal derived from the setting of the potentiometer R313.

The output from amplifier AR3 appears on lead 321 and is applied through the capacitor C313 to the centertap of the primary winding of transformer T301. Thus the output current from the third operational amplifier AR3 is applied to the two lines L1 and L2 in the manner described in connection with the earlier Figures to compensate for leakage currents from those lines to ground.

Considering now the lower part of FIG. 14A, it will be seen that for each of the lines L1 and L2 and for each of the sub-circuits SC/1 through SC/3 and in fact for all the other similar sub-circuits mentioned above but not illustrated, there is a first potentiometer (e.g., potentiometer R301) permitting a presetting of a current compensating for capacitive leakage current, and a second potentiometer (e.g., potentiometer R313) permitting a presetting of a current compensating for resistive leakage current. The phase distinction between the two currents is caused by the use of the capacitor C305 to apply the current originating on lead A1 to the input of operation amplifier AR3 with substantially 90° phase shift, the current originating on lead A2 being applied to the same input directly, i.e., without a 90° phase shift.

In each network 303, the four potentiometers are adjusted to match the leakage currents to ground for their associated lines.

These initial adjustments can be carried out in the manner described above in connection with FIG. 1, making use of a ground current monitor.

In the circuit of FIGS. 14A and 14B, the output current in lead 321 will be the sum of a first current which can be adjusted to be representative of the capacitive leakage currents, and a second current which can be adjusted to be representative of the resistive leakage currents. It will be seen that the upper potentiometers are those involved in the balancing of capacitive leakage currents, while the lower potentiometers are those involved in balancing resistive leakage currents.

It will be seen that the output in lead 321 is coupled back to the power lines L1 and L2 through the two halves of the centertapped primary transformer winding of transformer T301.

From a comparison of the circuit shown in FIGS. 14A and 14B with the circuit shown in FIGS. 6A and 6B, it will be seen that a considerable economy in parts has been effected by the improvements which are the subject matter of the present invention. The components needed for each added network 303 are both few and cheap, so decreasing the additional cost and increasing the reliability of the equipment.

I claim:

1. Protective means adapted to reduce the danger of electrical shock in a two-wire non-grounded electrical system, in which current generating means cause a first current to be injected between ground and a first terminal, this current being substantially equal to and in phase with a first leakage current between a first of the two lines of the system and ground, and in which the current generating means cause a second current to be injected between ground and a second terminal, this current being substantially equal to and in phase with a second leakage current between the second of the two lines of the said system and ground, and the said terminals being connected to at least one of the two said lines, whereby the part of the first leakage current which can flow from ground through a body to the second line, and the part of the second leakage current which can flow from ground through a body to the first line, are substantially reduced.

2. Protective means according to claim 1, and in which the first and second terminals are directly connected together.

3. Protective means according to claim 1, and in which the first and second terminals are directly connected together and a single current generator serves to produce both the said first current and the said second current.

4. Protective means according to claim 2, and in which the first and second terminals are both connected to a first only of the two said lines.

5. Protective means according to any of claims 1, and in which each of the first and second terminals is connected to a tapping on a coil winding connected at its ends respectively to the first and second lines.

6. Protective means according to claim 2, and in which both the first and second terminals are connected to a center tap on a coil winding connected at its ends respectively to the first and second lines.

7. Protective means according to claim 2, and in which both the first and second terminals are connected to a center tap on a primary winding of a transformer and the two ends of the said winding are connected respectively to the said first and second lines, and a secondary winding on the transformer provides electrical energy to drive the said current generating means.

8. Protective means as claimed in any of claims 1, wherein the system is an alternating current system and the leakage currents include capacitive components.

9. Protective means as claimed in any of claims 1, wherein the system is an alternating current system, and the protective means include first adjustable means by which compensation for capacitive leakage currents is provided and second adjustable means by which compensation of resistive leakage currents is provided.

10. Protective means as claimed in any of claims 1, wherein the system includes a plurality of sub-circuits and the protective means include separate adjusting means associated with each of those sub-circuits for compensation of capacitive leakage currents in that circuit.

11. Protective means as claimed in any of claims 1, and in which the system includes a plurality of sub-circuits and the protective means includes separate adjusting means associated with each of those sub-circuits for compensation of capacitive leakage currents in that sub-circuit, the first and second terminals are directly connected together, and a single generator serves to produce both the said first current and the said second current for all the sub-circuits.

12. A method of providing protection to reduce the danger of electrical shock in two-wire non-grounded electrical systems in which a first current is generated in phase with the leakage current from a first of the two lines of the system, this current being substantially equal to that leakage current, a second current is generated in phase with the leakage current from the second of the two lines to ground, this current being substantially equal to that second leakage current, and these two currents are applied to ground in such a manner as to neutralize the said leakage currents.

13. The method according to claim 12, in which both currents are generated in a single current generator.

14. The method according claim 13, in which the single current generator is connected between ground and one only of the two said lines.

15. The method according to claim 13, in which the single current generator is connected between ground and a center tap of a coil winding connected at its ends respectively to the two said lines.

16. The method according to claim 15, in which the said coil winding is a primary winding of a transformer and an alternating current is applied to a primary winding of the said transformer and generates e.m.fs. in two halves of the secondary winding respectively on opposite sides of the center tap.

17. The method of claim 12, and in which the system is an alternating current system and the leakage currents include capacitive components.

18. The method of claim 12, and in which separate adjustments of the injected current are carried out to compensate respectively for capacitive and for resistive components of the leakage current.

19. A protective device suitable for connection to a two-wire non-grounded electrical system and including connections respectively to ground, to a first of two lines of the system, and to a second of the two lines of the system, current generating means arranged to cause a first current to be injected between ground and a first terminal, this current being adjustable to be substantially equal to and in phase with a first leakage current between the said first line and ground, the current generating means also being arranged to cause a second current to be injected between ground and a second terminal, this current being adjustable to be substantially equal to and in phase with a second leakage current between the said second line and ground, and the said terminals being connected to at least one of the two said lines, whereby the part of the first leakage current which can flow from ground through a body to the second line, and the part of the second leakage current which can flow from ground through a body to the first line, are substantially reduced.

20. A protective device as claimed in claim 19, and in which first adjustable means enable the first current to be adjusted to match a capacitive leakage current, second adjustable means enable the first current to be adjusted to match a resistive leakage current, third adjustable means enable the second current to be adjusted to match a capacitive leakage current, and fourth adjustable means enable the second current to be adjusted to match a resistive leakage current.

21. A protective device as claimed in claim 20, and in which the system to be protected includes a plurality of sub-circuits and the protective means includes separate adjusting means associated with each of those sub-circuits for compensation for leakage currents in that sub-circuit, the said first and second terminals are connected together, and a single generator serves to produce both the said first current and the said second current for all the sub-circuits.

* * * * *